US006161005A

United States Patent [19]

Pinzon

[11] Patent Number: 6,161,005

[45] Date of Patent: Dec. 12, 2000

[54] DOOR LOCKING/UNLOCKING SYSTEM UTILIZING DIRECT AND NETWORK COMMUNICATIONS

[76] Inventor: Brian W. Pinzon, 705 Cervantes Ct., El Paso, Tex. 79922

[21] Appl. No.: 09/131,409

[22] Filed: Aug. 10, 1998

[51] Int. Cl.[7] .............................. H04Q 7/20; H04Q 7/32

[52] U.S. Cl. ...................... 455/403; 455/352; 455/151.4; 455/152.1; 455/151.2; 455/550; 340/825.31; 367/197; 367/198; 704/251; 704/208

[58] Field of Search .................................. 455/352, 353, 455/151.4, 152.1, 345, 38.3, 557, 403, 151.2, 550; 340/66, 41, 99, 825.44, 825.45; 367/197, 195; 704/251, 208, 275, 500

[56] References Cited

U.S. PATENT DOCUMENTS

| | | | |
|---|---|---|---|
| 4,249,040 | 2/1981 | Cutter | 340/66 |
| 4,491,690 | 1/1985 | Daley | 340/66 |
| 4,539,557 | 9/1985 | Redshaw | 340/66 |
| 4,573,046 | 2/1986 | Pinnow | 340/66 |
| 4,665,397 | 5/1987 | Pinnow | 340/66 |
| 4,835,533 | 5/1989 | Akutsu | 340/825.44 |
| 4,885,766 | 12/1989 | Yasuoka et al. | 340/66 |
| 4,931,789 | 6/1990 | Pinnow | 340/66 |
| 5,027,383 | 6/1991 | Sheffer | 340/66 |
| 5,081,667 | 1/1992 | Drori et al. | 340/66 |
| 5,113,427 | 5/1992 | Ryoichi et al. | 340/825.44 |
| 5,117,449 | 5/1992 | Metroka et al. | 340/825.44 |
| 5,334,974 | 8/1994 | Simms et al. | 340/66 |
| 5,335,264 | 8/1994 | Namekawa | 340/66 |
| 5,357,560 | 10/1994 | Nykerk | 340/66 |
| 5,418,537 | 5/1995 | Bird | 340/66 |
| 5,432,495 | 7/1995 | Tompkins | 340/66 |
| 5,490,200 | 2/1996 | Snyder et al. | 340/66 |
| 5,531,086 | 7/1996 | Bryant | 340/66 |
| 5,587,701 | 12/1996 | Hess | 340/66 |
| 5,588,038 | 12/1996 | Snyder | 340/66 |
| 5,606,307 | 2/1997 | Kuan | 340/66 |
| 5,907,418 | 5/1999 | Walczak et al. | 455/38.3 |
| 6,032,054 | 2/2000 | Schwinke | 455/557 |

*Primary Examiner*—Lee Nguyen
*Assistant Examiner*—Keith Ferguson
*Attorney, Agent, or Firm*—Bacon & Thomas, PLLC

[57] ABSTRACT

A remote door locking/unlocking system includes both telephone receiver/DTMF decoder circuitry and a wireless radio frequency or infrared sensor for enabling the system to be actuated either by a portable short range transmitter or by any telephone. The telephone circuitry or handset may be removably installed in the door so that it can be used with a variety of different cellular or satellite communications systems. An alternative to DTMF and/or radio frequency or infrared activation, speech recognition could be used to interpret voice commands transmitted over the network or picked up by a microphone.

31 Claims, 4 Drawing Sheets

DOOR LOCKING/UNLOCKING SYSTEM UTILIZING DIRECT AND NETWORK COMMUNICATIONS

BACKGROUND OF THE INVENTION

1. Field of the Invention

This invention relates to a remote door locking system, and in particular to a remote door locking system designed to utilize both direct transmissions such as radio frequency or optical (e.g., infrared) transmission using rolling codes, and wireless network communications.

2. Description of Related Art

Line-of-sight door locking and unlocking systems are now common in vehicles. In general, such systems utilize an infrared or radio frequency transmitter carried by the user, and a corresponding receiver connected to an integrated circuit controller capable of supplying an actuating signal to an electro-magnetic locking/unlocking mechanism built into a door of the vehicle. The controller may be a separate unit or a vehicle security system controller capable of initiating a variety of security system functions, including arming of the system and control of the engine of the vehicle.

Keyless entry systems are disclosed, for example, in U.S. Patent No. 4,931,789 (Pinnow) and U.S. Pat. No. 5,531,086 (Bryant), both of which are incorporated herein by reference, with the Pinnow patent describing an especially useful remote locking/unlocking system including a transmitter unit that may be incorporated in a portable electronic device, the display and circuitry of the electronic device being utilized to support the locking/unlocking functions. In an electronic wristwatch, for example, the power source, silicon integrated circuit chip, digital display, and battery of the electronic device serve the dual functions of telling time and generating coded signals for transmission to the electronic door locking/unlocking mechanism. The security codes in the device disclosed in this patent may be changed whenever desired by utilizing Electronically Erasable Programmable Read only Memory (EEPROM) pin-codes.

Short range radio frequency or line-of-sight communications are generally adequate for vehicle door locking/unlocking and have the advantages of simplicity, low cost operation, and convenience. In addition, line-of-sight devices have the advantage that transmission of the locking and unlocking codes cannot be intercepted and decoded unless the person challenging the system is within range of the transmitter, or has gained possession of the transmitter through loss or theft.

Nevertheless, the need for more remote actuation of vehicle security functions has led to proposals for the utilization of network communications to initiate security system functions such as alarm system arming or disarming, and disabling of the vehicle. U.S. Pat. No. 5,432,495 (Tompkins), for example, shows a system for remote locking by satellite, while U.S. Pat. No. 5,081,667 (Drori et al.) discloses what is described as a universal cellular interface for a vehicle security system and U.S. Pat. No. 5,606,307 discloses control of vehicle security functions via a pager network. In addition, U.S. Pat. No. 5,606,307 discloses a vehicle door lock controller activated by a wireless paging system. Each of these patents is incorporated by reference.

Both the systems of U.S. Pat. No. 5,432,495 and U.S. Pat. No. 5,081,667 share the principle of including in the vehicle a device that generates acoustic signals in response to receipt of radio frequency transmissions, either by satellite or over a cellular telephone network, the acoustic signals being respectively utilized by a acoustic sensor or a DTMF tone decoder to generate an electrical signal that controls a vehicle security function. However, the system of U.S. Pat. No. 5,432,495, like that of U.S. Pat. No. 5,606,307, has limited applicability because it utilizes a receiver that is capable of operating with only a single communications system, and thus require a dedicated transmitter and a subscription to a network that may not be the same as the one utilized by the owner of the vehicle for other personal communications. The system disclosed in U.S. Pat. No. 5,081,667, on the other hand, has the disadvantage that it requires a complex multiple protocol digital signal processing circuit with a relatively large memory to enable it to interface with a number of different cellular telephone systems and match the controller to the type of cellular system mounted in the vehicle. Furthermore, unlike the system of U.S. Pat. No. 4,931,781, none of the remote security system controllers includes provision for programming of codes by the user and therefore all are vulnerable to challenge by interception and recording of transmitted codes or control signals.

Of the three networked security systems described above, the one in U.S. Pat. No. 5,081,667 offers the most flexibility, but because of the complexity of the system is essentially suitable only for use in vehicles where the cost of the system might be reasonable in comparison with the cost of the vehicle being protected. For more general use, such as in a residence or in an office building or hotel with multiple doors, it would be desirable to provide a system with comparable versatility but at lower cost, and which provides for both networked and short range or line-of-sight locking/unlocking capabilities. In the case of a hotel, the ability to lock or unlock room doors from a central switch board while providing guest with individual line-of-sight transmitters would be especially advantageous.

SUMMARY OF THE INVENTION

It is accordingly an objective the invention to provide a remote door locking/unlocking system that utilizes both network communications and radio frequency, line-of-sight, or other direct communications to actuate the system.

It is a further objective of the invention to provide a remote door locking/unlocking system that utilizes network communications in order to provide door locking and unlocking capabilities from any location served by the network, and yet is easily adapted for use with a wide variety of different network communications systems, including cellular and satellite telephone networks, without the need for complex multiple protocol processing capabilities or a large memory area.

It is a still further objective of the invention to provide a remote door locking/unlocking system that utilizes both short range or line-of-sight communications and wireless network communications, and in which locking and unlocking codes may be varied either by using a rotating code arrangement in which the codes vary periodically, an arrangement in which the transmitter trains the receiver, or a user programmable arrangement such as the one disclosed in U.S. Pat. No. 4,931,789.

It is yet another objective of the invention to provide a remote door locking/unlocking system that is suitable for use not only in vehicle or car doors but also in a wide variety of other types of doors, including metal safe doors, garage doors, and home, hotel, or office doors.

These objectives are achieved, in accordance with the principles of a preferred embodiment of the invention, by providing an electronic door locking mechanism made up of a bracket or other mechanical arrangement for mounting a telephone handset within a door, a harness for electrically connecting the telephone handset to a power supply and to a controller, and a radio frequency or optical line-of-sight receiver also connected to the controller, the controller including signal processing circuitry for comparing stored codes with codes extracted from electrical signals received by either the telephone handset or the radio frequency/optical receiver, and for generating door locking and/or unlocking signals when a received code matches the stored code in order to activate an electrical door locking or unlocking mechanism.

In accordance with further principles of the preferred embodiment of the invention, the telephone handset is a wireless telephone handset, such as a cellular or satellite telephone handset, and mounting arrangement for the telephone handset is a basket holder situated in a recess in the door whose locking mechanism is to be remotely controlled, the recess being accessed by a removable cover plate that also affords access to battery or power supply connections and to a user interface that enables control codes to be entered or changed.

In an alternative embodiment of the invention, the cradle or basket holder for the handset is mounted on the exterior of the door and electric ally connected via cables to processing, power supply, and actuator circuitry and mechanisms located within the door.

In accordance with still further principles of the preferred embodiment of the invention, the mounting arrangement for the telephone handset includes, in addition to the handset connection harness, an RS-232, GPIB, or similar computer interface for enabling the controller to be connected an appropriate port on a computer so that software based encryption codes may be downloaded to the controller.

In an especially preferred embodiment of the invention, the door locking/unlocking arrangement utilizes the line-of-sight or radio frequency remote controller disclosed in U.S. Pat. No. 4,931,781, and a complementary user-carried handset is provided that provides both telephone and optical or radio frequency transmission options, including preset activation of door or car options either when the door or car is within range of the handset transmitter unit or when remote activation is desired, with optional audible or visual (e.g., LED) confirmation of locked/unlocked status in the case of line-of-sight transmissions, and optional confirmation via the network in case of remote activation.

It will be appreciated by those skilled in the art that the dual long-range short-range locking/unlocking system of the preferred embodiment of the invention may be used in a wide variety of doors, including doors for residential and commercial buildings, hotel room doors, garage doors, metal safe or security vault doors, and vehicle doors, either as a stand-alone unit or integrated into a security system.

In addition, while the telephone network utilized by the system of the invention may be an analog or digital cellular network, personal communications service (PCS), or satellite network such as the proposed Motorola IRIDIUM™ and/or Microsoft TELEDISC™ satellite-based telephone networks, the invention may also utilize a short-range wireless handset in conjunction with a base station connected to a standard wired telephone network located on the premises of the door to be remotely controlled.

DETAILED DESCRIPTION OF THE PREFERRED EMBODIMENTS

Figure 1:
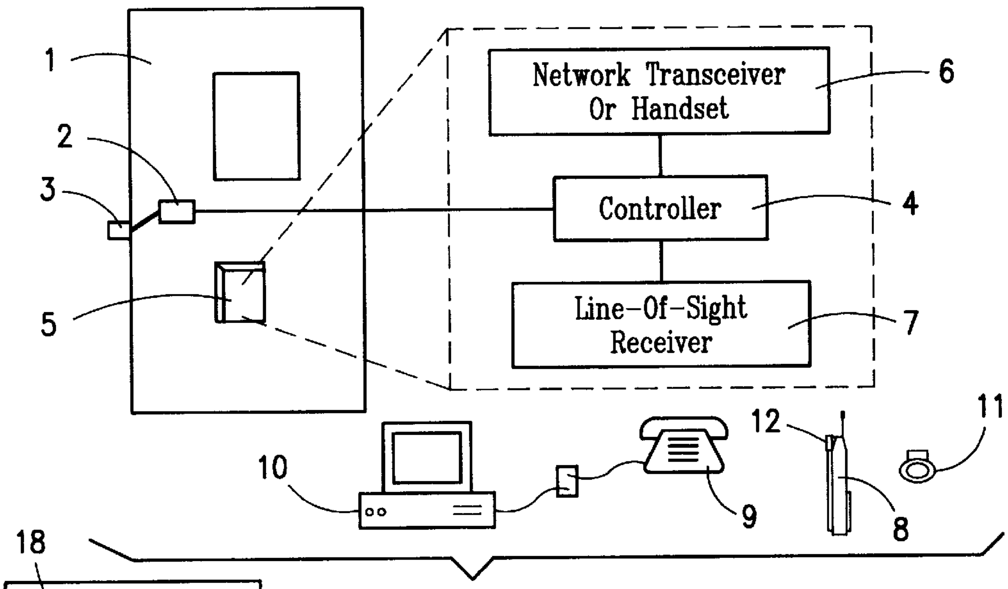
FIG. 1 is a schematic diagram of a remote door locking system constructed in accordance with the principles of a preferred embodiment of the invention.

FIG. 1 shows an example of a door locking system constructed in accordance with the principles of a first preferred embodiment of the invention.

The door locking system of FIG. 1 includes a door 1 provided with an electronic door locking mechanism 2 for operating a deadbolt and/or latch 3. The preferred electronic door locking mechanism may be similar to the ones described in U.S. Pat. Nos. 4,931,789 or 5,532,086, incorporated herein by reference, although those skilled in the art will be familiar with numerous different types of electronic door locking mechanisms, and appreciate that door locking mechanisms other than the ones described in U.S. Pat. Nos. 4,931,789 and 5,531,086 may be substituted within the scope of the invention.

All such electronic door locking mechanisms have in common a motor or solenoid that either directly or indirectly causes a mechanical locking member, or the pins of a key lock mechanism, to move to a locking or unlocking position, movement of the motor, solenoid, or combination of electromagnetic elements being initiated by an electrical signal from a comparison circuit which compares an input code with an internally stored code and initiates locking or unlocking if the code is determined to be valid. Since these elements of the preferred embodiment are well described in U.S. Pat. No. 4,931,789, they will not be further described herein.

In the arrangement illustrated in FIG. 1, the motor or solenoid actuated mechanism built into door 1 while the controller 4 is mounted within a recess 5 in the door. Also mounted in the recess is a network transceiver or handset unit 6 and a short range or line-of-sight receiver 7. Receiver 7 is electrically connected to the controller, but transceiver or handset 6 may be connected to the controller either by direct electrical connection via an audio output jack on the handset, using a harness similar to that found in many vehicles and which may be identical, by way of example, to the harness described in U.S. Pat. No. 5,081,667, or by means of an acoustic sensor that senses acoustic signals generated by the handset, such as the one described in U.S. Pat. No. 5,432,495, and converts them into electrical signals.

Whether the network transceiver or handset is acoustically or electrically coupled to the transceiver, the control signals are preferably coded signals similar to the coded signals conventionally used in remote controlled vehicle security systems. In the case of infrared or radio frequency signals, it is conventional to use pulse code modulation to send information in binary packets, while codes may be transmitted over a telephone line using DTMF tones or binary data packets using a variety of protocols, although acoustic transmissions, such as DTMF tones, are preferred because they can originate from virtually any telephone. Both acoustic and data signals may, depending on the network be encrypted, and in addition the data carried by the packets may be encrypted prior to transmission and circuitry included in the controller for decryption following reception.

Thus, in the example shown in FIG. 1, a locking/unlocking command may originate from any device with access to a telephone network, including a wireless telephone handset 8, wired telephone 9, or computer 10, and also from a line-of-sight optical or short range radio frequency transmitters 11,12 carried by the user or integrated into a portable telephone handset. In addition, as disclosed in U.S. Pat. No. 4,931,789, the locking/unlocking mechanism may also be operable by a conventional key arrangement, or by optical, capacitive, or other types of keys or proximity sensing devices. In the case of a proximity sensor, for example, the proximity transmitter could be included in the carrier or the cellular phone and be arranged to operate within a range of ten feet from the door or lock.

In the arrangement disclosed in U.S. Pat. No. 4,931,789, coded signals are processed by a signal processing integrated circuit having a programmable nonvolatile memory that allows the internally stored codes to be programmed through an appropriate user interface. An identical circuit may be used in the preferred embodiment illustrated in FIG. 1. In particular, the coded signals input to the controller from the network transceiver or handset may have a form identical, upon output from a DTMF or other decoder, to the form of the coded signals supplied by the receiver to the controller so that the same network comparison circuitry can be used to process codes received both from the network and from a radio frequency or optical transmitter arrangement. As a result, the controller can process short range or line-of-sight transmissions as well as network transmissions using the circuitry described in U.S. Pat. No. 4,931,789.

Instead of including a user interface that permits programming of the locking/unlocking codes directly through a user interface, the codes stored in the controller may be varied through use of circuitry that periodically changes the codes according to a predetermined algorithm, through use of a wireless input device that trains the controller to recognize certain codes, re-programs the controller, or has a rolling code controller, or in an especially advantageous embodiment of the invention through download from a portable computer via an appropriate wired or wireless communications interface. All of these arrangements for varying the codes can utilize components that are readily available from computer part suppliers, and that could easily be installed or added by those skilled in the art.

Figure 2B:
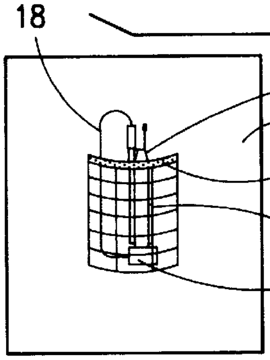
FIG. 2B is a schematic diagram of a variation of the door arrangement illustrated in FIG. 2A.
Figure 2A:
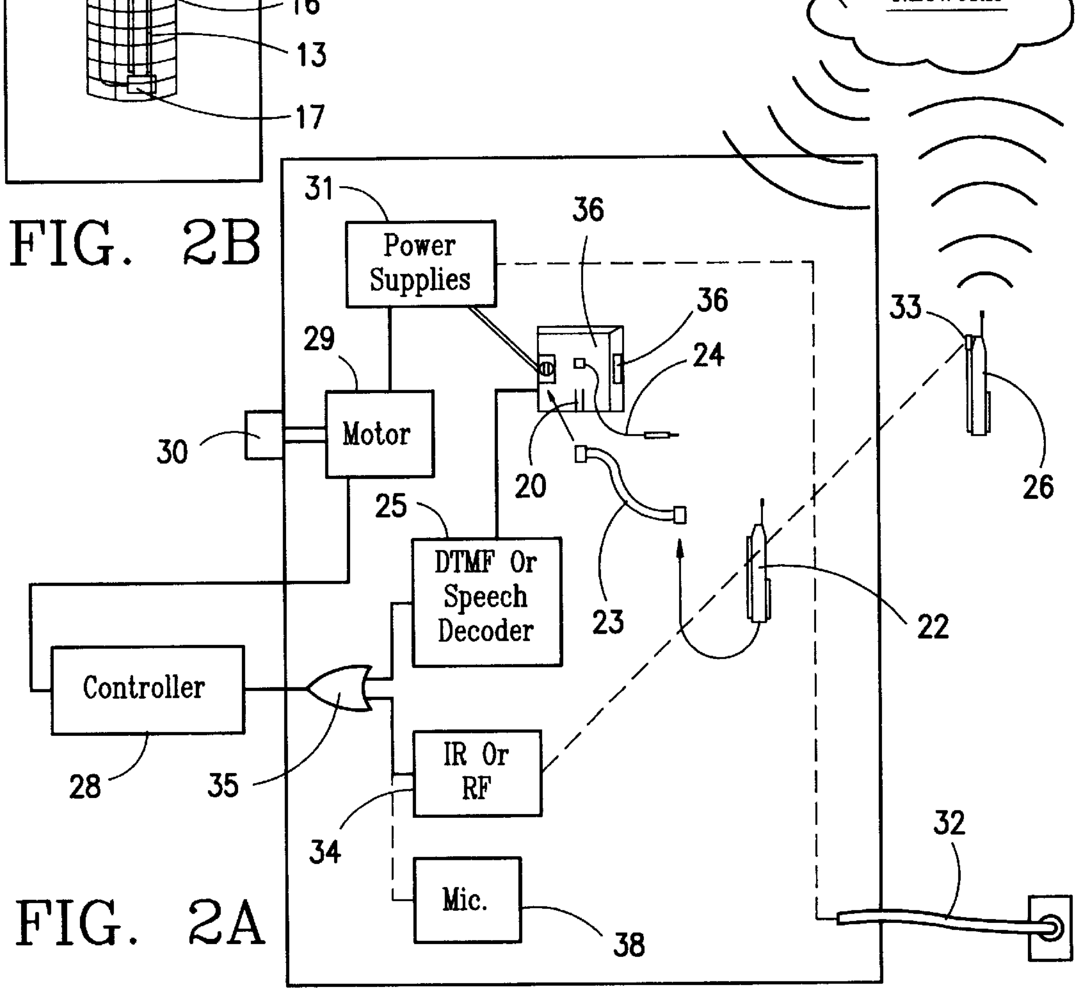
FIG. 2A is a schematic diagram showing details of a door arranged according to the principles of the preferred embodiment.

FIG. 2A shows a particularly preferred arrangement of a door locking/unlocking arrangement that permits the arrangement to be easily adapted to different types of cellular or other wireless telephone systems. In the arrangement of FIG. 2A, an adjustable cradle 20 is included in the recess 21 for mounting a telephone headset 22. Numerous examples of such cradles are currently used in vehicles, and adaptation for purposes of the present invention would simply involve mounting the cradle within a recess cut into or provided in the door by the door manufacturer.

During mounting of a handset in the cradle, either removably or permanently, a power supply cord 23 and an audio signal output cable 24 are plugged into corresponding jacks on the telephone handset. The power connector jack typically permits the handset to be controlled to turn off and on and to provide answer and call disconnect functions, while the audio output provides an audio frequency signal output that can be supplied to a DTMF tone decoder (or speech decoder) 25 in order to decode signals received by the telephone from a calling telephone 26 over the wireless network 27.

Power to the handset power connector, main controller 28, and motor or solenoid 29 for operating the door latch 30 may be supplied by a variety of different power supplies 31, including Nicad, Metal Hydride, or Lithium batteries for the handset and circuitry, a nine-volt battery or four AA or similar batteries for the motor or solenoid mechanism, and/or a 110 or 220 volt AC power supply 32 and appropriate transformer and power conditioning circuitry (not shown). Alternatively, power may be supplied by a solar panel for primary or back-up power supply purposes.

As in the example of FIG. 1, locking/unlocking signals may be supplied either by a telephone 26, or by a radio frequency or line-of-sight transmitter 33 integrated with the telephone or worn or carried as a separate device. The supply of the signals received by the handset 22 and optical or radio frequency receiver 34 to the controller 28 is schematically illustrated as a logical OR gate 35, although those skilled in the art will appreciate that the signals may be separately processed by the controller in order to extract the locking or unlocking codes for comparison with stored codes. Also shown in a microphone 38 that could be used in conjunction with voice recognition software in addition to or in place of the sensor 34.

In this embodiment, programming of locking/unlocking codes is carried out by download from a portable computer, personal digital assistant (PDA), or other computing device, and thus the recess 21 includes a connector into which a data communications cable can be plugged, or a wireless data communications interface. Well-known examples of connectors and data communications interfaces that could be used in this context include RS-232 connectors, GPIB connectors, as well as serial or parallel connectors and wireless data communications transceivers of various types.

In a variation of the embodiment illustrated in FIG. 2A, a cradle 13 may be placed on the exterior of the door 14 so that a telephone 15 can more easily be mounted in the cradle and secured by an appropriate means such as a Velero™ strap 16. In that case, all power supplies, circuitry, and actuators are still built-in to the door as in the embodiment of FIG. 2A, but a power supply connector 17 is arranged at an appropriate position, for example at the base of the cradle, and a corresponding jack 18 for the audio output of the telephone is situated so that it can be plugged into the telephone after the telephone has been placed in the cradle. The cradle may be made of wire or any other suitable material arranged for convenience and or aesthetic purposes.

Figure 3:
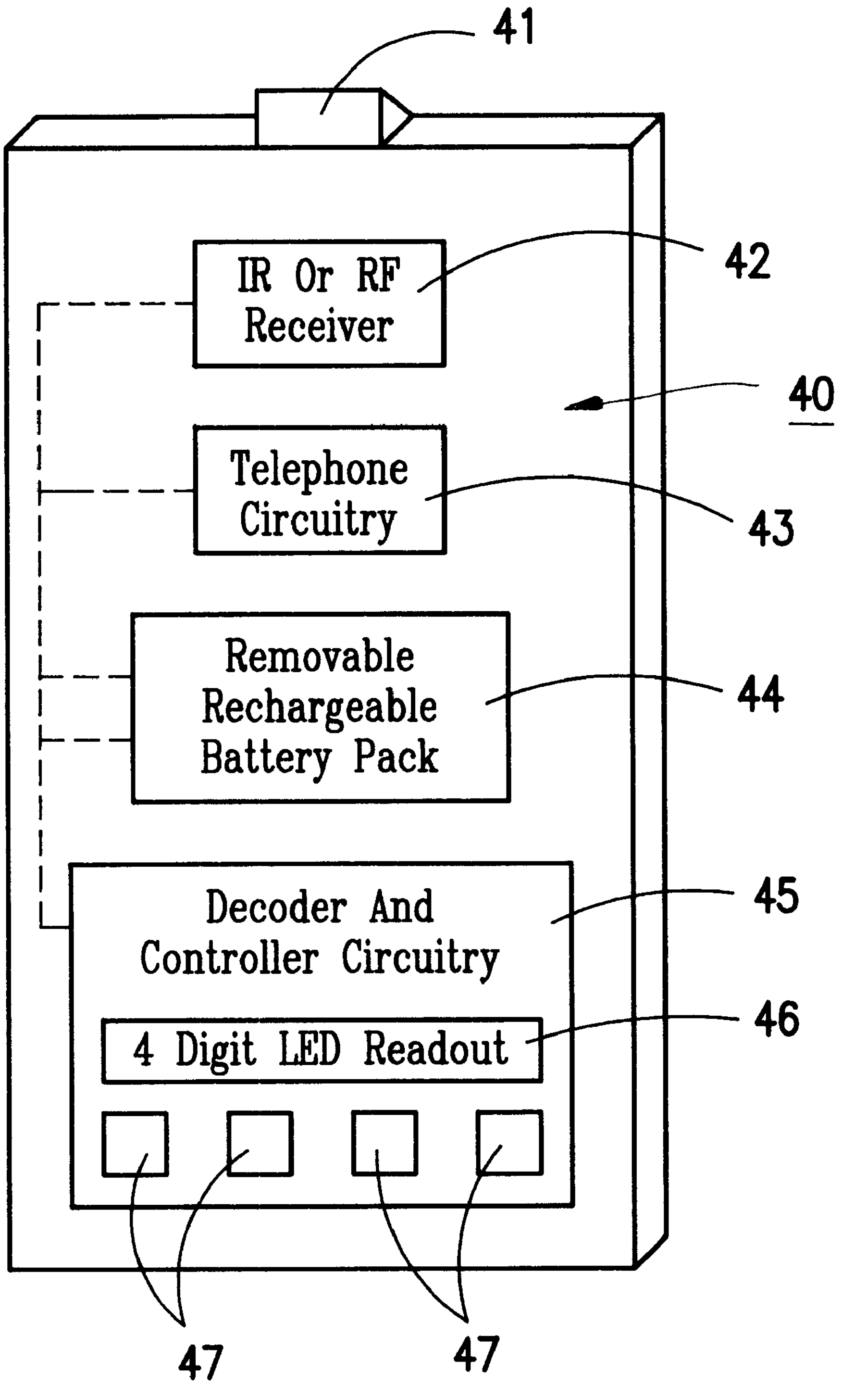
FIG. 3 is a schematic diagram showing a door panel for use in connection with the locking/unlocking arrangement of the preferred embodiment of the invention.

Those skilled in the art will appreciate that although the inclusion of a cradle for enabling the user to plug in different types of cell phones depending on the system with which the user has, or wishes to obtain, an account is especially convenient and represents a preferred embodiment of the invention, it is also possible to build telephone circuitry directly into a removable door panel, as illustrated in FIG. 3, so that a network protocol can be selected by simply choosing an appropriate panel, the panel including all necessary power supply and data connections. In the embodiment illustrated in FIG. 3, the panel 40 includes a release button 41, telephone circuitry 42 including an antenna (not shown), a removable rechargeable battery pack 43, decoder/ control circuitry 44, a four digit or larger LED display 45 for displaying menus and entered data, and at least four buttons 46 that allow a user to program in four digit or larger locking and unlocking codes. Preferably, when the password or code necessary to execute a locking or unlocking function is being entered by the user, the entered numbers will not be echoed on the display but rather will appear as unrelated characters such as asterisks so as to prevent eavesdropping. The display can be arranged to show the numbers initially twice for verification and thereafter each time the code is changed.

Figure 4:
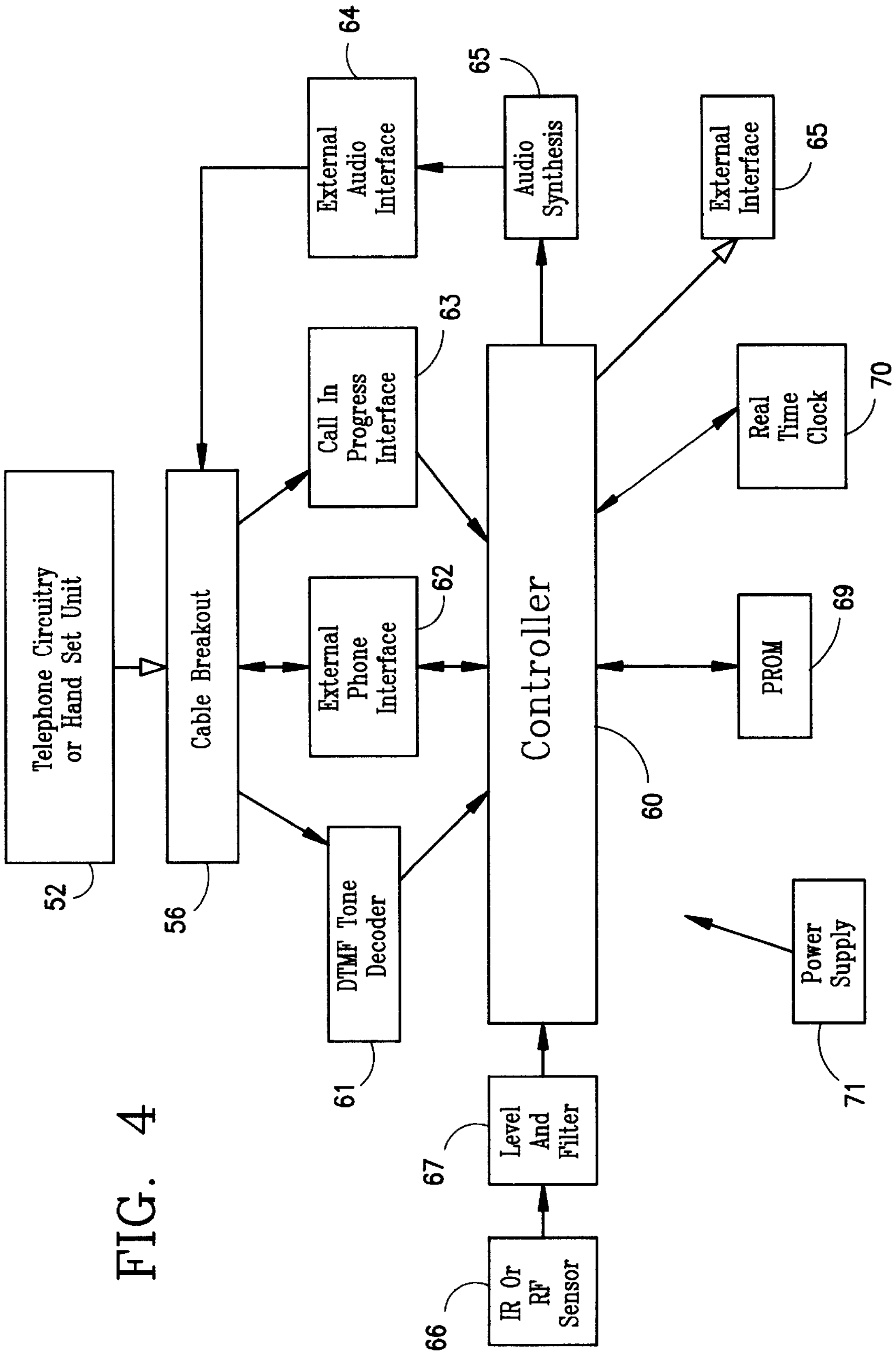
FIG. 4 is a schematic circuit diagram showing details of a controller for use in the locking/unlocking arrangement illustrated in FIGS. 1–3.

As shown in detail in FIG. 4, the handset used in the handset cradle embodiment of FIGS. 1 and 2, or the telephone circuitry used in the removable door panel arrangement of FIG. 3, collectively represented by element 52, is connected to the decoder and control circuitry by a cable breakout 56 which includes any necessary cables or harnesses as well as relays and other switching elements for providing digital interfacing between the handset or telephone circuitry and the controller, as necessary.

In the schematic of FIG. 4, the controller is designated by reference numeral 60 and is preferably implemented with a microprocessor. As discussed below, the cable breakout 56 provides interconnection to the controller 60 via one or more interface units including a dual tone multiple frequency (DTMF) decoder 61, an optional external telephone interface 62, a call-in-progress interface 63, and external telephone interface 64, all of which are commercially available devices. The DTMF decoder 61 decodes DTMF tones from the telephone 52 while the external telephone interface unit 62 listens for audio, detects the telephone on/off status, and provides access thereto for the controller 60, and the call-in-progress interface 63 performs filtering, signal level conversion, and buffering functions and detects ringing, busy signals, etc. An optional external interface 64 cooperates with a synthesizer 65 to provide audio from the synthesizer on command after receiving digital output from the controller 10 in order to confirm operation of the lock or programming functions.

Inputs from a radio frequency or optical sensor 66, are received by the system controller 60 via level conversion and filtering circuits 67. As may be necessary for a particular input, the level conversion and filtering circuits 67 convert received signals from analog to digital, and adjust the level of the signals received in a manner well known to those skilled in the art. The lock mechanism interface 68 performs a similar function to the level conversion and filtering circuit 17, but converts digital signals from the controller 60 to signal levels necessary to operate the locking mechanism. Finally, controller 60 is connected to a memory 69 for storing operating programs, telephone communications protocols, and security codes, a clock circuit 70, and power supply circuitry 71.

Figure 5:
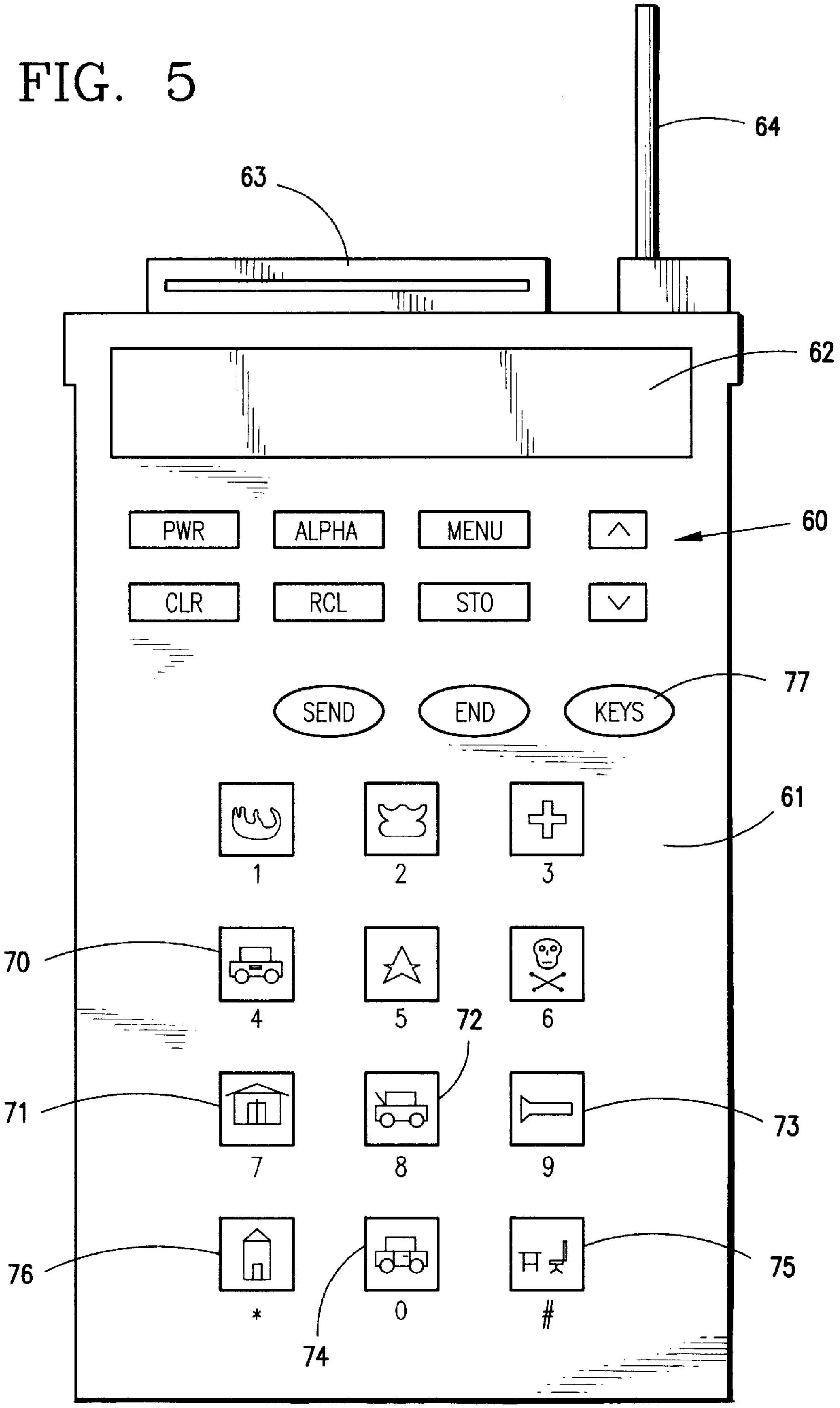
FIG. 5 is a plan view of a handset constructed in accordance with the principles of a preferred embodiment of the invention.

An exemplary layout for a wireless phone/transmitter combination 60 that may be used in connection with the locking/unlocking arrangement of the present invention is illustrated in FIG. 5. The wireless telephone/transmitter combination of FIG. 5 includes, as is conventional, a numeric keypad in which different keys may be arranged to activate preset functions such as dialing of emergency numbers for fire, police, and medical services, poison control and the like. Included in the pre-programmed keys are keys that control various locking unlocking functions, illustrated as a key 70 for activating a car engine engagement, a key 71 for the garage, key 72 for the trunk, a key 73 for the car and/or, home alarms keys 74 and 75 for respective car and office doors, and 76 is for a home door.

The locking/unlocking keys are programmed to dial telephone numbers in the usual manner of keys of this type, and in particular to dial the numbers of handsets of circuitry arranged to activate the indicated door locking mechanisms, and in addition may be programmed to transmit DTMF coded signals after the destination handset or circuit has answered the call. Alternatively, instead of automatically transmitting the codes after a connection is established, the password or code necessary to execute a locking or unlocking function may be manually entered by the user using the numeric keypad, with the entered numbers either appearing on the display for verification, or appearing as unrelated characters such as asterisks so as to help prevent eavesdropping.

In order to conveniently utilize the short range or line-of-sight transmission function, a function key 77 is provided for switching the function of the keypad so that the corresponding locking/unlocking keys are caused to activate the transmitter 78 when pressed rather than to dial the number of a corresponding handset or telephone circuit and transmit codes via the antenna 64, thus allowing the wireless telephone/transmitter unit to be used in the same manner as the transmitter described in U.S. Pat. No. 4,931,789 for both short range and long range transmissions.

Having thus described various preferred embodiments of the invention, those skilled in the art will appreciate that variations and modifications of the preferred embodiment may be made without departing front the scope of the invention. For example, instead of relying on DTMF tones to transmit codes, speech decoder circuitry could be included within the door for actuating the motor or solenoid in response to voice signals transmitted over the network, with authentication of the voice signals being provided by a spoken password or by voice recognition software.

In addition, a microphone could be included in the door for direct voice actuated locking/unlocking using the same speech or voice recognition software, so that the "wireless" signals used to lock or unlock the door would be in the form of acoustic voice signals in addition to or in place of the infrared or radio frequency signals used in the embodiments described in detail above. In addition, programming or changing of codes could possibly be based on voice commands.

It is accordingly intended that the invention not be limited by the above description or accompanying drawings, but that it be defined solely in accordance with the appended claims.

I claim:

1. A locking/unlocking arrangement for a door, comprising:

a controller;

an electrically actuated mechanism for locking or unlocking a door in response to an electrical signal from the controller;

a cradle arranged to support different types of telephone handsets, said telephone handsets being capable of receiving telephone signals over a telephone network and outputting audio signals;

audio signal receiving and decoding circuitry electrically connected to the controller for receiving and decoding said audio signals from said telephone handset when the telephone handset is mounted in the cradle;

a sensor arranged to receive wireless signals directly from a portable transmitter;

non-audio wireless signal receiving circuitry connected between the sensor and the controller and arranged to transmit said wireless signals received by said sensor from said portable transmitter to the controller, wherein said controller is arranged to receive said audio signals from said telephone handset after decoding by audio signal receiving and decoding circuitry, and is further arranged to receive said wireless signals from said sensor and, depending on whether the controller has received said decoded audio signals or said wireless signals, compare either the decoded telephone signals or wireless signals with codes stored in a memory, and actuate the locking/unlocking mechanism in response to said comparison, and whereby inclusion of said cradle arranged to support different types of telephone handsets permits a user to select a desired said network by selecting a handset arranged to receive signals from said network, and whereby inclusion of a sensor and non-audio signal receiving circuitry in addition to said cradle and audio signal receiving and decoding circuitry permits the locking/unlocking mechanism to be actuated by signals transmitted directly from said portable transmitter to said controller, and also by telephone signals sent over said telephone network.

2. An arrangement as claimed in claim 1, wherein said telephone network is selected from the group consisting of cellular telephone networks, digital personal communication system (PCS) networks, and satellite telephone networks.

3. An arrangement as claimed in claim 1, wherein said transmitter is integrated into a portable wireless telephone.

4. An arrangement as claimed in claim 1, wherein said transmitter is an infrared transmitter.

5. An arrangement as claimed in claim 1, further comprising means for varying said stored codes.

6. An arrangement as claimed in claim 5, wherein said stored codes are varied periodically.

7. An arrangement as claimed in claim 5, wherein said stored codes are varied by transmitting training codes from a transmitter to the sensor.

8. An arrangement as claimed in claim 5, further comprising a display and keys arranged to enable locking codes to be manually stored.

9. An arrangement as claimed in claim 5, wherein said means for varying the codes comprises an interface arranged to receive codes downloaded from a computer.

10. An arrangement as claimed in claim 1, wherein said door is a door of a building.

11. An arrangement as claimed in claim 1, wherein said door is a garage door, whereby said garage door may be opened remotely through the telephone network or directly by a garage door opener.

12. An arrangement as claimed in claim 1, further comprising a power supply harness for transmitting power from a power source included in said door to a handset situated in said cradle.

13. An arrangement as claimed in claim 1, further comprising means for audibly confirming a locking/unlocking operation.

14. An arrangement as claimed in claim 1, wherein said cradle is situated in a recess in the door.

15. An arrangement as claimed in claim 1, wherein said cradle is mounted on an exterior of the door.

16. An arrangement as claimed in claim 1, wherein said circuitry electrically connected to the controller for receiving and decoding audio signals includes DTMF tone decoder circuitry.

17. An arrangement as claimed in claim 1, wherein said circuitry electrically connected to the controller for receiving and decoding audio signals includes speech recognition circuitry.

18. A locking/unlocking arrangement for a door, comprising:

a controller;

an electrically actuated mechanism for locking or unlocking a door in response to an electrical signal from the controller;

telephone signal receiving circuitry connected to the controller and arranged to receive and decode telephone signals that have been transmitted over a telephone network;

a sensor arranged to receive wireless signals directly from a portable transmitter;

non-telephone wireless signal receiving circuitry connected between the sensor and the controller and arranged to transmit said wireless signals to the controller, wherein said controller is arranged to receive said decoded telephone signals from said telephone signal receiving and decoding circuit and said wireless signals from said non-telephone wireless signal receiving circuitry and, depending on whether the controller has received said decoded telephone signals or said wireless signals, compare either the decoded telephone signals or wireless signals with codes stored in a memory, and actuate the locking/unlocking mechanism in response to said comparison, and wherein said controller is situated in a removable door panel arranged to be mounted in the door whose locking mechanism is to be remotely controlled, and whereby inclusion of a sensor and non-telephone wireless signal receiving circuitry in addition to said telephone signal receiving and decoding circuitry permits the locking/unlocking mechanism to be actuated by signals transmitted directly from said portable transmitter to said controller, and also by telephone signals sent over said telephone network.

19. An arrangement as claimed in claim 18, wherein said telephone network is selected from the group consisting of cellular telephone networks, digital personal communication system (PCS) networks, and satellite telephone networks.

20. An arrangement as claimed in claim 18, wherein said transmitter is integrated into a portable wireless telephone.

21. An arrangement as claimed in claim 18, wherein said transmitter is an infrared transmitter.

22. An arrangement as claimed in claim 18, further comprising means for varying said stored codes.

23. An arrangement as claimed in claim 22, wherein said stored codes are varied periodically.

24. An arrangement as claimed in claim 22, wherein said stored codes are varied by transmitting training codes from a transmitter to the sensor.

25. An arrangement as claimed in claim 22, further comprising a display and keys arranged to enable locking codes to be manually stored.

26. An arrangement as claimed in claim 22, wherein said means for varying the codes comprises an interface arranged to receive codes downloaded from a computer.

27. An arrangement as claimed in claim 18, wherein said door is a door of a building.

28. An arrangement as claimed in claim 18, wherein said door is a garage door, whereby said garage door may be opened remotely through the telephone network or directly by a garage door opener.

29. An arrangement as claimed in claim 18, further comprising means for audibly confirming a locking/unlocking operation.

30. An arrangement as claimed in claim 18, wherein said circuitry electrically connected to the controller for receiving and decoding telephone signals includes DTMF tone decoder circuitry.

31. An arrangement as claimed in claim 18, wherein said circuitry electrically connected to the controller for receiving and decoding telephone signals includes speech recognition circuitry.

* * * * *